US012596416B2

(12) United States Patent
     Monarski

(10) Patent No.: US 12,596,416 B2
(45) Date of Patent: Apr. 7, 2026

(54) POWER OVER ETHERNET CARD WITH EXPANDED POWER FOR POWER SOURCING EQUIPMENT

(71) Applicant: LANTRONIX, Irvine, CA (US)

(72) Inventor: Peter Monarski, Saint Louis Park, MN (US)

(73) Assignee: Lantronix, Inc., Irvine, CA (US)

( * ) Notice: Subject to any disclaimer, the term of this patent is extended or adjusted under 35 U.S.C. 154(b) by 48 days.

(21) Appl. No.: 18/604,983

(22) Filed: Mar. 14, 2024

(65) Prior Publication Data

US 2025/0291395 A1     Sep. 18, 2025

(51) Int. Cl.
| | |
|---|---|
| *G06F 1/26* | (2006.01) |
| *G06F 1/186* | (2026.01) |
| *G06F 13/42* | (2006.01) |

(52) U.S. Cl.
CPC ............... *G06F 1/26* (2013.01); *G06F 1/186* (2013.01); *G06F 13/4221* (2013.01); *G06F 2213/0026* (2013.01)

(58) Field of Classification Search
None
See application file for complete search history.

(56) References Cited

U.S. PATENT DOCUMENTS

| | | | | |
|---|---|---|---|---|
| 5,699,317 A | * | 12/1997 | Sartore | ................. G11C 11/005 |
| | | | | 365/49.1 |
| 2013/0094167 A1 | * | 4/2013 | Chen | ....................... G06F 1/185 |
| | | | | 361/791 |
| 2015/0346802 A1 | * | 12/2015 | Nakai | ................ G03G 15/5004 |
| | | | | 713/310 |
| 2016/0299561 A1 | * | 10/2016 | Middleton | .......... G06F 13/4045 |
| 2021/0173461 A1 | * | 6/2021 | Sridharan | ............. G06F 1/3209 |

* cited by examiner

*Primary Examiner* — Paul Yen
(74) *Attorney, Agent, or Firm* — Haynes and Boone, LLP

(57) ABSTRACT

Disclosed are POE cards having a PCIe edge connector, configured to couple to a PCIe edge connector slot of a computing device, to receive power from a power supply. The card also includes an Ethernet interface device having ports for connection to POE capable devices through Ethernet cables. A DC-DC converter is configured to boost a voltage of power received at least partially through the PCIe edge connector from a first voltage to a second voltage. A POE controller is coupled between the Ethernet interface device and the DC-DC converter and is configured to control delivery of power to the POE capable devices connected to the ports. A switch is coupled to the Ethernet interface device to provide data communication between the computing device, coupled to the POE card through the PCIe edge connector, and a network or the POE capable devices connected to the ports.

15 Claims, 3 Drawing Sheets

POWER OVER ETHERNET CARD WITH EXPANDED POWER FOR POWER SOURCING EQUIPMENT

BACKGROUND OF THE INVENTION

The present invention relates to Power-Over-Ethernet (POE) providing cards, for example in the form of Network Interface Controller (NIC) switching cards, for computing devices which provide Ethernet connections for devices configured to receive power over the Ethernet connection.

Power-Over-Ethernet has become a very useful technology to bring power to remote devices that otherwise would require a new dedicated power supply outlet. This is especially true in the video and surveillance market. New more advanced camera systems are being developed and installed at a rapid rate. The installation of these cameras can become extremely expensive when it is required to also route power to the installed location. With POE, this expense is eliminated as the data and power are both run using a single and inexpensive Ethernet Unshielded-Twisted-Pair (UTP) cable. With power being included with the data over a single UTP cable, the headend device is no longer a simple Ethernet device, but is instead an Ethernet device with POE injection. The POE power can be IEEE.802.3af (15.4 W), 802.3af (30 W), or 802.3bt (60 W or 90 W).

To accommodate these POE power levels, large power supplies embedded in the headend device are typically required. Frequently, this involves installing a separate dedicated POE supply that feds multiple outputs ranging from a few watts to multiple hundreds of watts. This can be expensive as well as mechanically and thermally challenging. Alternative methods of providing POE power would therefore be beneficial in reducing costs and addressing thermal constraints associated with providing higher levels of POE power.

The discussion above is merely provided for general background information and is not intended to be used as an aid in determining the scope of the claimed subject matter.

SUMMARY

This Summary is provided to introduce a selection of concepts in a simplified form that are further described below in the Detailed Description. This Summary is not intended to identify key features or essential features of the claimed subject matter.

Exemplary disclosed embodiments include a Power-Over-Ethernet (POE) card having a peripheral component interconnect express (PCIe) edge connector, configured to couple to a PCIe edge connector slot of a board of a computing device, to receive power from a power supply of the computing device. The card also includes one or more Ethernet interface devices having Ethernet ports for connection to POE capable devices through Ethernet cables. A DC-DC converter is configured to boost a voltage of power received from the power supply of the computing device, at least partially through the PCIe edge connector, from a first voltage to a second voltage higher than the first voltage. A POE controller is coupled between the Ethernet interface device and the DC-DC converter and is configured to control delivery of power at the second voltage to the POE capable devices connected to the Ethernet ports. A switch is coupled to the Ethernet interface device to provide data communication between the computing device, coupled to the POE card through the PCIe edge connector, and a network or the POE capable devices connected to the Ethernet ports.

In some disclosed embodiments, the POE card further includes at least one PCIe pin connector configured to couple to corresponding pin connectors of cables connected to the power supply of the computing device to receive additional power from the power supply of the computing device. A power combining controller is coupled to the PCIe edge connector and to the at least one PCIe pin connector and configured to combine power received from the power supply through the PCIe pin connector and through the PCIe edge connector into a pool of power available for use in powering POE devices connected to the Ethernet ports. In some exemplary embodiments, the at least one PCIe pin connector comprises a first PCIe pin connector and a second PCIe pin connector. For example, the first PCIe pin connector can be a 6-pin PCIe pin connector and the second PCIe pin connector can be an 8-pin PCIe pin connector.

BRIEF DESCRIPTION OF THE DRAWINGS

FIGS. 2-1 and 2-2 are diagrammatic end and side views, respectively, of some exemplary embodiments of the POE card shown in FIG. 1 configured to provide POE power to connected devices.

DETAILED DESCRIPTION

Figure 1:
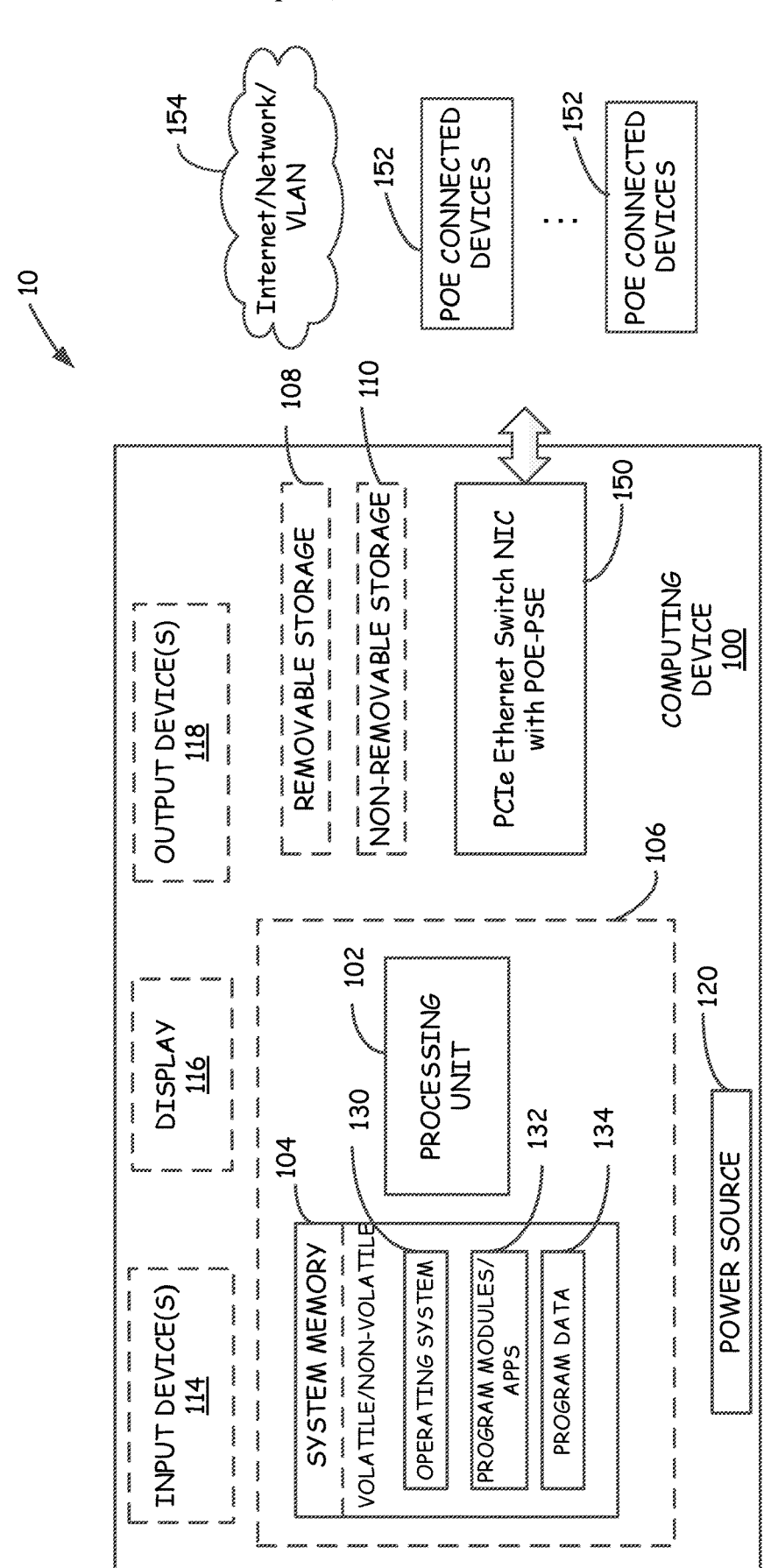
FIG. 1 is a block diagram illustrating an example embodiment of a computing device having a Power-Over-Ethernet (POE) card, such as an Ethernet switch Network Interface Controller (NIC) card, configured to provide POE power to connected devices.

Before disclosed embodiments are explained in detail, it is to be understood that the disclosed embodiments are not limited in application to the details of construction and the arrangement of components set forth in the following description or illustrated in the following drawings. Other embodiments can be used, and the disclosed methods, apparatus and systems can be practiced or carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "connected," "coupled" and variations thereof are used broadly and encompass both direct and indirect connections and couplings. Further, "connected" and "coupled" are not restricted to physical or mechanical connections or couplings.

Exemplary disclosed embodiments are implemented in Power-Over-Ethernet (POE) providing cards, such as certain Network Interface Controller (NIC) switch cards, for use in computers which provide Ethernet connections and power for devices configured to receive power over the Ethernet connection. Exemplary electronic cards utilize a combination of peripheral component interconnect express (PCIe) connections to a mother board and/or to a computer power supply to provide a larger pool of power for POE compatible devices (e.g., such as cameras) over the corresponding Ethernet connections. Disclosed cards can be included with, or provided as an add-in for, a computer such as a personal computer (PC). However, other embodiments can be implemented without a separate card. The exemplary embodiments include electronic cards for use with computers, computer implemented methods, computer readable instructions, and configured computing devices. Disclosed embodiments can also include graphical user interfaces (GUIs) for use in identifying power management and configuration information to a user.

Although not required, disclosed embodiments are at times described in the general context of computer-executable instructions, such as program modules or apps, being executed by an electronic device such as microcontroller, a microprocessor, etc. Generally, program modules include routines, programs, objects, components, data structures, etc. that perform particular tasks or implement particular abstract data types.

In the description that follows, disclosed embodiments can be described with reference to acts and symbolic representations of operations that are performed by one or more devices, unless indicated otherwise. As such, it will be understood that such acts and operations, which are at times referred to as being computer-executed, include the manipulation by microcontrollers, microprocessors, processing units, or other circuitry of the device of electrical signals representing data in a structured form. This manipulation transforms the data or maintains it at locations in the memory system of the device, which reconfigures or otherwise alters the operation of the device in a manner well understood by those skilled in the art. The data structures where data is maintained are physical locations of the memory that have particular properties defined by the format of the data. However, while disclosed embodiments are described in the foregoing context, it is not meant to be limiting as those of skill in the art will appreciate that various of the acts and operations described hereinafter may also be implemented in hardware such as application-specific integrated circuits (ASICs), discrete circuitry components, etc.

FIG. 1 shows a computing device 100, such as a PC, having an Ethernet switch NIC card 150 configured to provide POE to devices 152 connected to Ethernet or network ports 230 (shown in FIGS. 2-1, 2-2 and 3) of card 150. Card 150 also provides network communication access for computing device 100 with one or more networks 154 through one or more network ports 230. While disclosed embodiments are described primarily with reference to an Ethernet switch NIC card, a computing device 100 and a system 10 including the computing device and card, those of skill in the art will understand that the disclosed principles and embodiments can be implemented in other types of POE cards.

In its most basic configuration, the computing device 100 includes at least a processing unit 102 and a memory 104. Depending on the exact configuration and type of computing device, the memory 104 may be volatile (such as RAM), non-volatile (such as ROM, flash memory, etc.) or some combination of the two. This most basic configuration is illustrated in FIG. 1 by a dashed line 106.

Additionally, the device 100 may also have further features/functionality. For example, the device 100 may also include additional storage (removable and/or non-removable) including, but not limited to, magnetic or optical disks or tapes, USB flash drives, memory cards, etc. Such additional storage is illustrated in FIG. 1 by a removable storage 108 and a non-removable storage 110. Computer storage media includes volatile and nonvolatile, removable and non-removable media implemented in any method or technology for storage of information such as computer readable instructions, data structures, program modules or other data.

The memory 104, the removable storage 108 and the non-removable storage 110 are all examples of computer storage media. Computer storage media includes, but is not limited to, RAM, ROM, EEPROM, flash memory or other memory technology, CDROM, digital versatile disks (DVD) or other optical storage, magnetic cassettes, magnetic tape, magnetic disk storage or other magnetic storage devices, or any other medium which can be used to store the desired information and which can accessed by the device 100. Any such computer storage media may be part of the device 100.

System memory 104 may include operating system 130, one or more programming modules or apps 132, and program data 134. Operating system 130, for example, may be suitable for controlling computing device 100's operation. As stated above, a number of program modules 132 and data files 134 may be stored in system memory 104, including operating system 130.

Generally, consistent with disclosed embodiments, program modules or apps may include routines, programs, components, data structures, and other types of structures that may perform particular tasks or that may implement particular abstract data types. Moreover, disclosed embodiments may be practiced with other computer system configurations, including multiprocessor systems, microprocessor-based or programmable consumer electronics, minicomputers, mainframe computers, and the like. Disclosed embodiments may also be practiced in distributed computing environments where tasks are performed by remote processing devices that are linked through a communications network. In a distributed computing environment, program modules may be located in both local and remote memory storage devices.

Furthermore, some disclosed embodiments may be practiced in an electrical circuit comprising discrete electronic elements, packaged or integrated electronic chips containing logic gates, a circuit utilizing a microprocessor, or on a single chip containing electronic elements or microprocessors. Some disclosed embodiments may also be practiced using other technologies capable of performing logical operations such as, for example, AND, OR, and NOT, including but not limited to mechanical, optical, fluidic, and quantum technologies. In addition, some disclosed embodiments may be practiced within a general purpose computer or in any other circuits or systems.

Disclosed embodiments, for example, may be implemented as a computer process (method), a computing system, or as an article of manufacture, such as a computer program product or computer readable media. The computer program product may be a computer storage media readable by a computer system and encoding a computer program of instructions for executing a computer process. Accordingly, the disclosed embodiments may be embodied in hardware and/or in software (including firmware, resident software, micro-code, etc.). In other words, some disclosed embodiments may take the form of a computer program product on a computer-usable or computer-readable storage medium having computer-usable or computer-readable program code embodied in the medium for use by or in connection with an instruction execution system. A computer-usable or computer-readable medium may be any non-transitory medium that can contain, store, communicate, propagate, or transport the program for use by or in connection with the instruction execution system, apparatus, or device.

As mentioned above, the computing device 100 has installed therein card 150 including an Ethernet switch NIC that that allows the computing device to connect to a network 154, such as the Internet, a virtual local area network (VLAN), or other networks. Such connection can be made through RJ-45 type connectors (Ethernet ports) 230 provided by card 150. Further, devices 152 connected through the Ethernet ports of card 150 for communication of data also receive power for powering the devices through the Ethernet ports. Card 150 is discussed in greater detail in FIGS. 2-1, 2-2 and 3.

Still referring to FIG. 1, also shown with computing device 100 are one or more display devices 116, one or more input devices 114, such as a keyboard, mouse, pen, voice input device, etc., for providing other input to the computing device, and one or more other output devices 118 such as speakers, a printer, a vibration generator, etc. All these devices are well known in the art and need not be discussed at greater length here. Further, display device 116, input devices 114 and output devices 118 can all be considered to be separate from, or alternatively part of, computing device 100.

Computing device 100 has a power source 120, such as a power supply, that provides power for computations, communications and so forth by the device 100. Computing device 100 is configured such that power source 120 ultimately provides power for card 150, and can provide power, using Power-Over-Ethernet (POE) technology and standards, to connected POE compatible devices 152. In accordance with exemplary embodiments, higher levels of power are available for use by the POE connected devices 152 due to configurations of card 150 which allow the power to be sourced from a PCIe edge connector or a combination of PCIe edge and pin connectors.

Figures 1, 2:
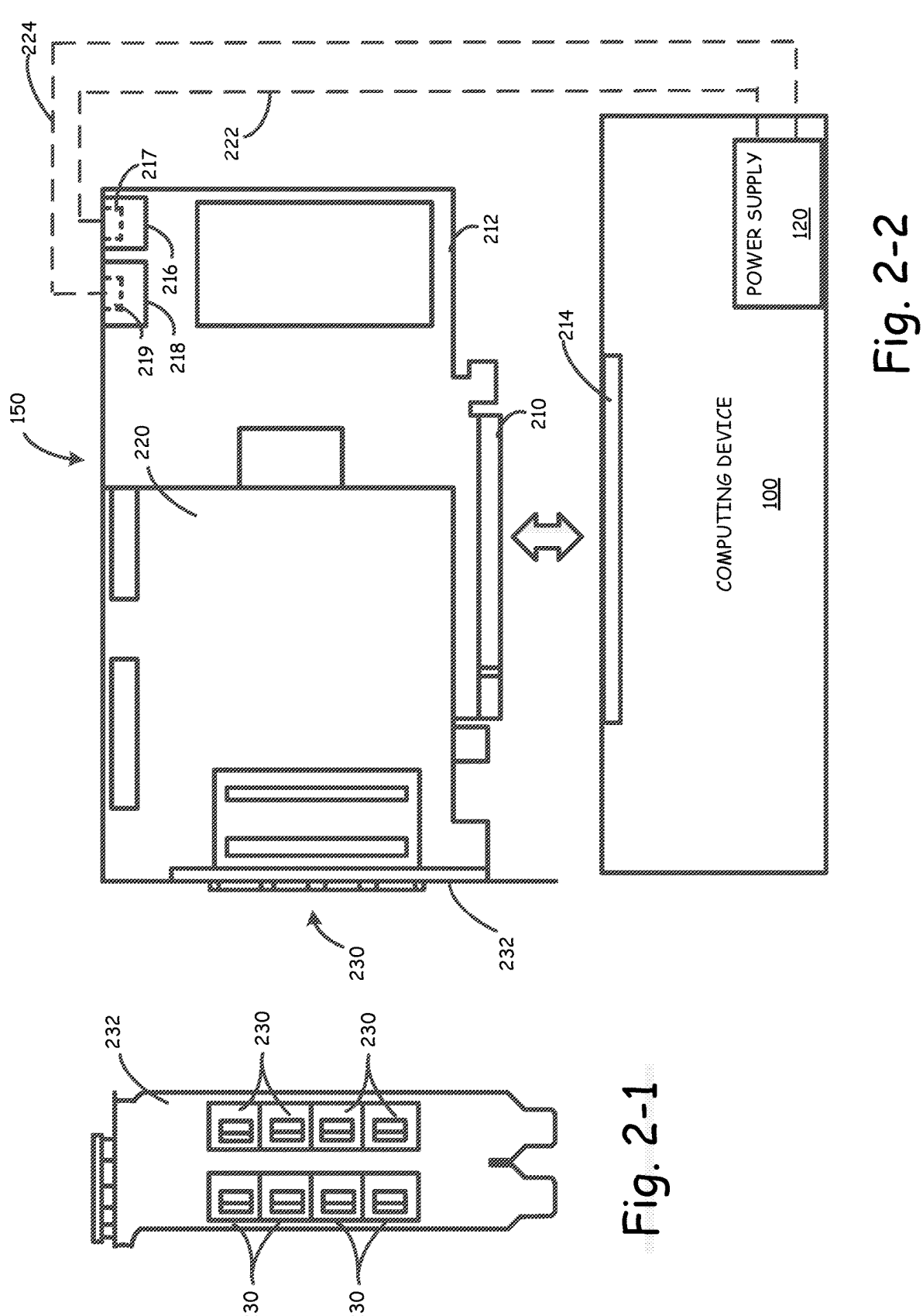
Figure 3:
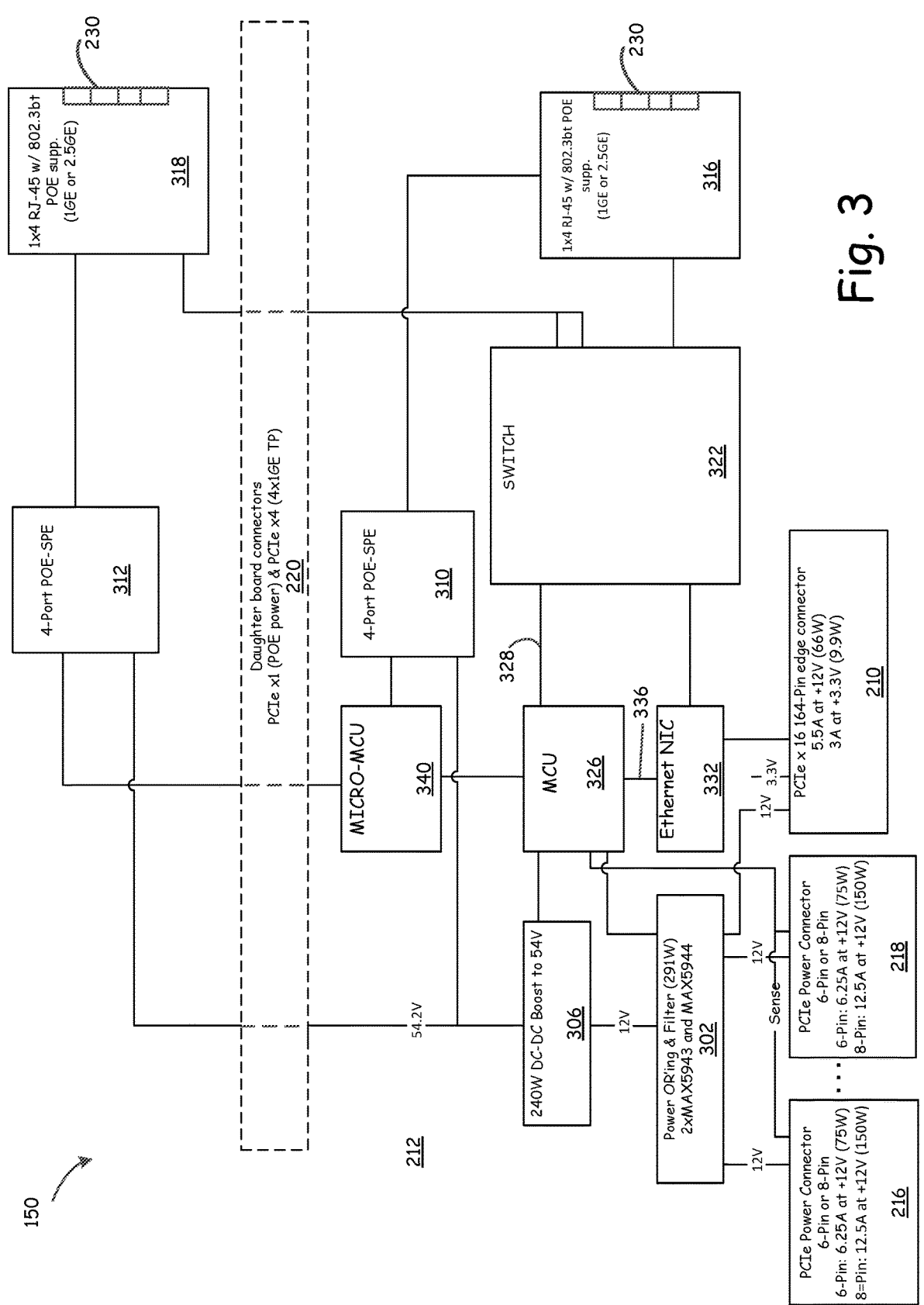
FIG. 3 is a block diagram of the POE card shown in FIGS. 1, 2-1 and 2-2 in accordance with some exemplary embodiments.

As is described further with reference to FIGS. 2-1, 2-2 and 3, in exemplary disclosed embodiments, card 150 is provided with a new arrangement of components and functionality such that power from a PCIe edge connector and power from one or more PCIe 6-pin and/or 8-pin connectors is pooled together to provide higher levels of power for providing POE power to connected devices 152 (shown in FIG. 1). Referring now more specifically to FIGS. 2-1 and 2-2, shown are diagrammatic end and side views of card 150 in accordance with an exemplary embodiment. As shown diagrammatically in FIG. 2-2, card 150 has main circuit board 212 with a PCIe edge connector 210 configured to plug into a PCIe port or slot 214, typically positioned on a mother board of computing device 100, to receive power from the power supply 120 of the computing device. While shown diagrammatically near an outside edge of computing device 100, those of skill in the art understand that card 150 will typically be positioned within a case of computing device 100 when connected to PCIe edge connector slot 214. Positioned on main circuit board 212, or elsewhere on card 150, are one or more PCIe pin connectors for being connected to power supply 120 via cables. Shown are two PCIe pin connectors 216 and 218 which are configured to receive corresponding pin connectors 217 and 219, respectively, of cables 222 and 224 connected to power supply 120. In one exemplary embodiment, the PCIe pin connectors can include a 6-pin connector 216 and an 8-pin connector 218, each receiving different levels of power from power supply 120 in accordance with the PCIe industry standards. However, in other embodiments, both of connectors 216 and 218 can be of the same size (6-pin or 8-pin). Further, fewer or additional pin connectors can be included. In yet other embodiments, no PCIe pin connectors are included, and POE power is derived only from the PCIe edge connector 210.

As discussed below with reference to FIG. 3, card 120 includes circuitry configured to identify from the PCIe connectors how much power is available, to pool the power from the PCIe edge connector 210 and the one or more plugged-in PCIe pin connectors 216 and 218, and to provide power from the pool to devices 152 connected through Ethernet ports 230 on the card 150. As can be seen in FIG. 2-1, with card 150 installed within the enclosure of computing device 100, the Ethernet ports 230 can be accessible from outside of the enclosure through apertures in a plate 232 of the computing device or of the card 150. Various numbers of Ethernet ports can be provided. In the illustrated embodiment, a daughter card circuit board 220 is included as part of card 150, and each of the main circuit board 212 and daughter card circuit board 220 are configured to provide four Ethernet ports. Other configurations and numbers of ports can be utilized in other embodiments.

Referring now to FIG. 3, shown is a block diagram of one example embodiment of POE card 150 as discussed above with reference to FIGS. 1, 2-1 and 2-2. Card 150 includes main circuit board 212 having a PCIe edge connector 210 configured to connect to PCIe port or slot 214 on a board of computing device 100 to receive power from the power supply 120. In some exemplary embodiments, PCIe edge connector is a PCIe x16 164-pin connector configured to operate at 5.5 amps and +12 volts to provide 66 W of power for use by POE devices 152. This type of connector 210 also allows operation at 3 amps and +3.3 volts to provide 9.9 W of power for use by POE devices 152. While in an exemplary embodiment PCIe edge connector 210 is a x16 connector, in other embodiments, PCIe edge connector 210 can be of other sizes. For example, the PCIe interface 210 can be a x1, x4, or a x8 interface. Such different size PCIe interface embodiments draw from the power supply, and provide for use by POE devices 152, a corresponding lesser amount of power.

Also shown are PCIe pin connectors 216 and 218 as discussed above which are configured to connect to the power source or supply through cables and corresponding pin connectors. Again, in an exemplary embodiment, connector 216 can be a 6-pin PCIe connector, while connector 218 can be an 8-pin PCIe connector, each receiving levels of power from power supply 120 in accordance with the PCIe industry standards. For example, a 6-pin connector 216 receives up to 75 W of power for use by POE devices 152, while an 8-pin connector 218 receives up to 150 W of power for use by the POE devices. In various embodiments, both of connectors 216 and 218 can be 6-pin connectors, both can be 8-pin connectors, or they can be a combination of 6-pin and 8-pin connectors. Generally, disclosed embodiments include at least one PCIe pin connector along with the PCIe edge connector 210, but can include two or more PCIe pin connectors to provide additional power for POE devices 152.

Power from PCIe edge connector 210 and PCIe pin connectors 216 and 218 is provided as an input to power combining (OR'ring) controller 302. Controller 302 combines power from all of the 12V PCIe power sources into a general pool of 12V power. In one example, PCIe edge connector 210 draws 66 W of power, while a 6-pin connector 216 draws 75 W and an 8-pin connector 218 draws 150 W. The combined pool of 12V power from these sources is provided from an output of controller 302 to the input of a DC-DC converter 306, which boosts to voltage to 54V. The 54V power pool is provided to one or more POE controllers 310 and 312 for delivery to POE devices, such as video cameras or other equipment configured to operate using POE power, through Ethernet interface devices 316 and 318. Ethernet interface devices 316 and 318 provide ports 230 for connection to POE capable devices 152 through Ethernet cables. While two 4-port Ethernet interface devices 316 and 318 are shown, a single Ethernet interface device can be provided in other embodiments. In the illustrated embodiment, a daughter card circuit board 220 is included and coupled to a connector on main circuit board 212 in order to support the second POE controller 312 and the second Ethernet interface device 318. In embodiments using only a single POE controller 310 and a single Ethernet interface device 316, daughter card circuit board 220 can be omitted.

To make card 150 an Ethernet switching card, also included is a switch device 322 that handles the data linkage between the ports 230 of Ethernet interface devices 316, 318 and the computing device 100. This allows one of ports 230 to be used to connect computing device 100 to a network 154 (shown in FIG. 1). Again, others of ports 230 can be connected to POE compatible devices 152 to provide both data communication between the computing device 100 and the connected devices, and to provide POE power to the connected devices over the same port. A built in Ethernet Network Interface Controller (NIC) 332 serves as the interface of computing device 100 into the switch 322, allowing the computing device 100 to communicate with the network 154 through switch 322 and a port 230 of devices 316 or 318. The data paths through NIC 332, switch 322 and a network port 230 are also used to communicate between computing device 100 and devices 152 connected to the network ports.

Also included in card 150 in an exemplary embodiment is a microcontroller unit (MCU) 326. The MCU 326 has an interface 326 with the NIC 332 and an interface 328 with the switch 322. The MCU 326 controls sub-processor or micro-MCU 340, which in turn controls POE controllers 310 and 312. The MCU 326 is configured to communicate and provide power management information between computing device 100 and the POE controllers 310 and 312. Each of the PCIe pin connectors 216 and 218 have sense pins that allow the MCU 326 to determine whether they are plugged in and connected to the power supply 120. This allows the identification of how much power is available in the power pool for providing POE power to connected devices 152. The power management information communicated to the computing device includes how much power is being delivered to the card 150 by identifying any of PCIe pin connectors 216 and 218 that are connected to the power supply to provide power to be combined with power from PCIe edge connector 210. The management information can also include data indicating how much power is being used, how much power remains available, etc. This management information is communicated back to the computing device 100 through PCIe edge connector 210 and is used to drive an application or program module 132 of the computing device. Such application configures the processing unit 102 of the computing device to control a display 116 to graphically illustrate to a user which of network ports 230 are active (have a POE capable device connected thereto), how much power the connected devices are using, how much power is available, and similar POE management information.

Disclosed embodiments include POE cards which provide POE power, to devices connected to Ethernet ports, with the power derived or obtained at least partially from a PCIe edge connector 210. This provides increased available POE power levels as compared to conventional POE cards. In some exemplary embodiments, the available POE power is further increased by combining the power received through PCIe edge connector 210 with power received through one or more PCIe pin connectors 216 and/or 218.

Although the present invention has been described with reference to preferred embodiments, workers skilled in the art will recognize that changes may be made in form and detail without departing from the spirit and scope of the invention.

What is claimed is:

1. A Power-Over-Ethernet (POE) card comprising:
   a peripheral component interconnect express (PCIe) edge connector, configured to couple to a PCIe edge connector slot of a board of a computing device to receive power from a power supply of the computing device for one or more POE capable devices;
   an Ethernet interface device having one or more Ethernet ports for coupling to the one or more POE capable devices;
   a DC-DC converter configured to boost a voltage of the power for the one or more POE capable devices received through the PCIe edge connector from a first voltage to a second voltage higher than the first voltage;
   a POE controller coupled between the Ethernet interface device and the DC-DC converter and configured to control delivery of power at the second voltage to the POE capable devices while the POE capable devices are connected to the Ethernet ports to provide power received from the computing device through the PCIe edge connector to the connected POE capable devices;
   a switch coupled to the Ethernet interface device to provide data communication between the computing device and the POE capable devices while the computing device is coupled to the PCIe edge connector and while the POE capable devices are connected to the Ethernet ports;
   at least one PCIe pin connector configured to couple to corresponding pin connectors of cables connected to the power supply of the computing device to receive power from the power supply of the computing device; and
   a power combining controller coupled to the PCIe edge connector and to the at least one PCIe pin connector and configured to combine power received from the power supply through the PCIe pin connector and through the PCIe edge connector into a pool of power, wherein the DC-DC converter is coupled between the power combining controller and the POE controller and is configured to boost the voltage of the pool of power from the first voltage to the second voltage, wherein a sum of the power received through the PCIe pin connector and the power received through the PCIe edge connector is greater than a maximum power of the PCIe pin connector.

2. The POE card of claim 1, further comprising a Network Interface Controller (NIC) coupled between the PCIe edge connector and the switch.

3. The POE card of claim 1, wherein the at least one PCIe pin connector comprises a first PCIe pin connector and a second PCIe pin connector.

4. The POE card of claim 3, wherein the first PCIe pin connector is a 6-pin PCIe pin connector and the second PCIe pin connector is an 8-pin PCIe pin connector.

5. The POE card of claim 3, further comprising at least one controller having a microcontroller unit (MCU), wherein the at least one controller is coupled to an Network Interface Controller (NIC) and to the switch, and wherein the at least one controller is configured to control the POE controller and to communicate and provide power management information to the computing device.

6. The POE card of claim 5, wherein the at least one controller is configured to determine total power available in the pool of power and to include the total power available in the power management information.

7. The POE card of claim 6, wherein the at least one controller is configured to determine how much power is being delivered to the POE capable devices connected to the Ethernet ports and to include how much power is being delivered in the management information.

8. The POE card of claim 1, wherein the POE card is configured to:

determine how much power is being delivered to the POE capable devices; and communicate to the computing device how much power is being delivered to the POE capable devices.

9. A method of operating a Power-Over-Ethernet (POE) card, the method comprising:

receiving power for one or more POE capable devices at a peripheral component interconnect express (PCIe) edge connector from a power supply of a computing device;

boosting a voltage of the received power for the one or more POE capable devices, wherein the voltage is boosted from a first voltage to a second voltage higher than the first voltage;

delivering the power received from the computing device through the PCIe edge connector to the POE capable devices at the second voltage;

providing data communication between the computing device and the POE capable devices;

receiving power for the one or more POE capable devices at one or more PCIe pin connectors from the power supply of the computing device;

combining power received from the power supply through the PCIe pin connector and power received from the power supply through the PCIe edge connector into a pool of power; and boosting the voltage of the pool of power from the first voltage to the second voltage, wherein a sum of the power received through the PCIe pin connector and the power received through the PCIe edge connector is greater than a maximum power of the PCIe pin connector.

10. The method of claim 9, wherein the one or more PCIe pin connectors comprise a first PCIe pin connector and a second PCIe pin connector.

11. The method of claim 10, wherein the first PCIe pin connector is a 6-pin PCIe pin connector and the second PCIe pin connector is an 8-pin PCIe pin connector.

12. The method of claim 9, further comprising:

determining a total power available in the pool of power; and providing the total power available in the pool of power to the computing device.

13. The method of claim 9, further comprising:

determining how much power is being delivered to the POE capable devices; and communicating how much power is being delivered to the POE capable devices to the computing device.

14. The method of claim 9, further comprising controlling delivery of power at the second voltage to the POE capable devices while the POE capable devices are connected to Ethernet ports of the POE card to provide power received from the PCIe edge connector to the connected POE capable devices.

15. A system comprising:

one or more Power-Over-Ethernet (POE) capable devices; and a computing device comprising:

a power supply; and a POE card, comprising:

a peripheral component interconnect express (PCIe) edge connector coupled to a PCIe edge connector slot of a board to receive power from the power supply for the one or more POE capable devices;

an Ethernet interface device having one or more Ethernet ports coupled to the one or more POE capable devices;

a DC-DC converter configured to boost a voltage of the power for the one or more POE capable devices received through the PCIe edge connector from a first voltage to a second voltage higher than the first voltage;

a POE controller coupled between the Ethernet interface device and the DC-DC converter and configured to control delivery of power from the PCIe edge connector at the second voltage to the POE capable devices; and a switch coupled to the Ethernet interface device to provide data communication between the computing device and the POE capable devices;

at least one PCIe pin connector coupled to corresponding pin connectors of cables coupled to the power supply to receive power from the power supply;

a power combining controller coupled to the PCIe edge connector and to the at least one PCIe pin connector and configured to combine power received from the power supply through the PCIe pin connector and through the PCIe edge connector into a pool of power; and wherein the DC-DC converter is coupled between the power combining controller and the POE controller and is configured to boost the voltage of the pool of power from the first voltage to the second voltage, wherein a sum of the power received through the PCIe pin connector and the power received through the PCIe edge connector is greater than a maximum power of the PCIe pin connector.

\*    \*    \*    \*    \*